United States Patent [19]

Akiyama et al.

[11] 4,444,499
[45] Apr. 24, 1984

[54] DETECTOR FOR USE IN OPTICAL MEASURING INSTRUMENTS

[75] Inventors: Osamu Akiyama, Kyoto; Tetsuo Ichikawa, Shiga, both of Japan

[73] Assignee: Shimadzu Corporation, Kyoto, Japan

[21] Appl. No.: 361,144

[22] Filed: Mar. 24, 1982

[30] Foreign Application Priority Data

Apr. 28, 1981 [JP] Japan .................................. 56-64807

[51] Int. Cl.³ .............................................. G01J 3/42
[52] U.S. Cl. .................................... 356/325; 250/207; 356/448
[58] Field of Search ................................ 250/207, 227; 356/319-325, 408, 434, 448, 447, 217, 218, 225, 221, 226, 229

[56] References Cited

U.S. PATENT DOCUMENTS 2,930,281 3/1960 Dunn .................................. 356/221
3,504,978 4/1970 Shibata et al. ...................... 356/325
3,516,746 6/1970 Shibata et al. ...................... 356/319

FOREIGN PATENT DOCUMENTS 1522892 10/1969 Fed. Rep. of Germany ...... 356/225

Primary Examiner—F. L. Evans
Attorney, Agent, or Firm—Fidelman, Wolffe & Waldron

[57] ABSTRACT

A detector for use in optical measuring instruments such as a double-beam spectrophotometer, comprising a photoelectric element having a photosensitive surface and a beam mixer disposed adjacent the photosensitive surface for causing each of two alternate light beams to be projected evenly and uniformly onto the photosensitive surface of the photoelectric element thereby to eliminate errors which would otherwise be caused in the result of measurement due to local difference in sensitivity of the photosensitive surface of the photoelectric element. The beam mixer comprises a symmetrical pair of light diffusing plates so arranged as to form a roof-shaped configuration and a tublar body having one end opening closed by the pair of light diffusing plates and the opposite end opening closed by the photosensitive surface of the photoelectric element.

15 Claims, 5 Drawing Figures

DETECTOR FOR USE IN OPTICAL MEASURING INSTRUMENTS

BACKGROUND OF THE INVENTION

This invention relates to a detector for use in various optical measuring instruments such as a double-beam spectrophotometer or an instrument for measuring the light reflectivity of a sample. More particularly, the invention relates to a detector which comprises a single photoelectric element and a beam mixer disposed adjacent the photosensitive surface of the element for alternately directing two beams of light, one from a sample being measured and the other for use as a reference, to the photosensitive surface of the single photoelectic element.

In a light reflectivity measuring instrument, the light beam emerging from a monochromator is divided by a beam splitter into two beams, one of which is used as the reference beam while the other beam is projected onto a sample in the form of, for example, a sheet for measurement of the light reflected by the sample.

For measurement of the reflectivity of light by the sample if two different photoelectric elements are used separately to detect the reference and sample beams, errors will be caused in the result of measurement due to drift and/or difference in sensitivity characteristic between the two elements.

To overcome the difficulty the two optical paths of the reference and sample beams may be combined into a single path so that the two beams are projected onto a single photoelectric element. Such combination, however, requires several mirrors to be added to the optical system so that the instrument as a whole becomes larger-sized and the inner structure more complex.

The same problem is encountered in a double-beam spectrophotometer.

SUMMARY OF THE INVENTION

Accordingly, the primary object of the invention is to enable a single photoelectric element to measure two light beams efficiently without the necessity of using any optical device for combining the paths of the two light beams into a single path.

Another object of the invention is to provide a detector which is substantially completely free of errors in measurement which would otherwise be caused by local difference in sensitivity of the photosensitive surface of the detector and which enables measurement with an improved efficiency of use of light for measurement and consequently with a high sensitivity.

Another object of the invention is to provide a detector which makes an optical measuring instrument incorporating the detector compact in size and simple in structure.

Another object of the invention is to provide an optical measuring instrument which employs the aforesaid detector.

The invention will be described in detail with reference to the accompanying drawings.

DETAILED DESCRIPTION OF ILLUSTRATED EMBODIMENTS

Figure 1:
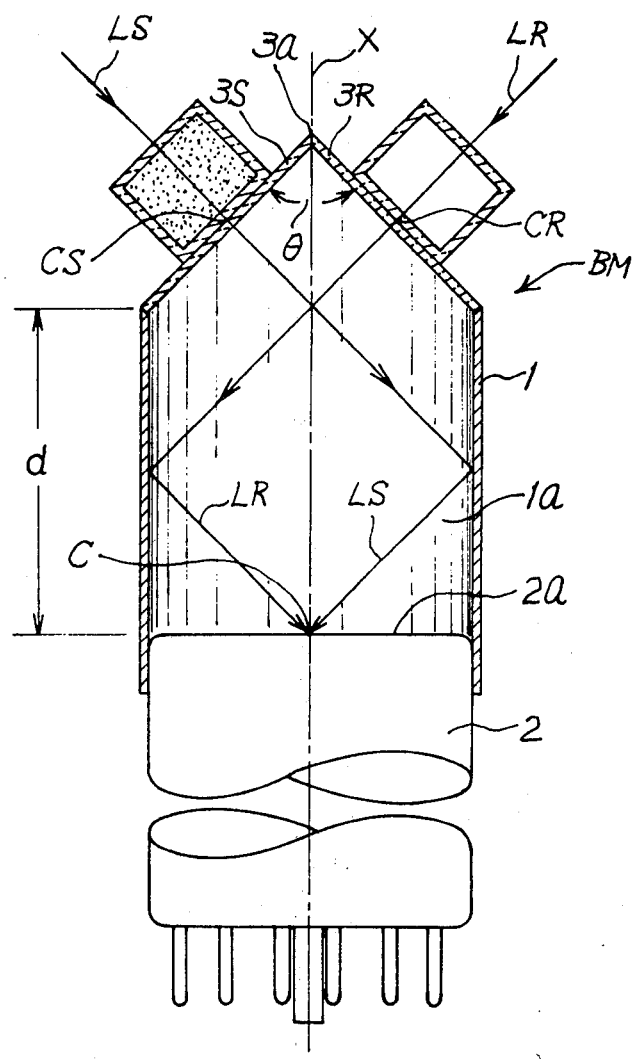
FIG. 1 shows a longitudinal section of a detector with a beam mixer constructed in accordance with the invention.
Figure 2:
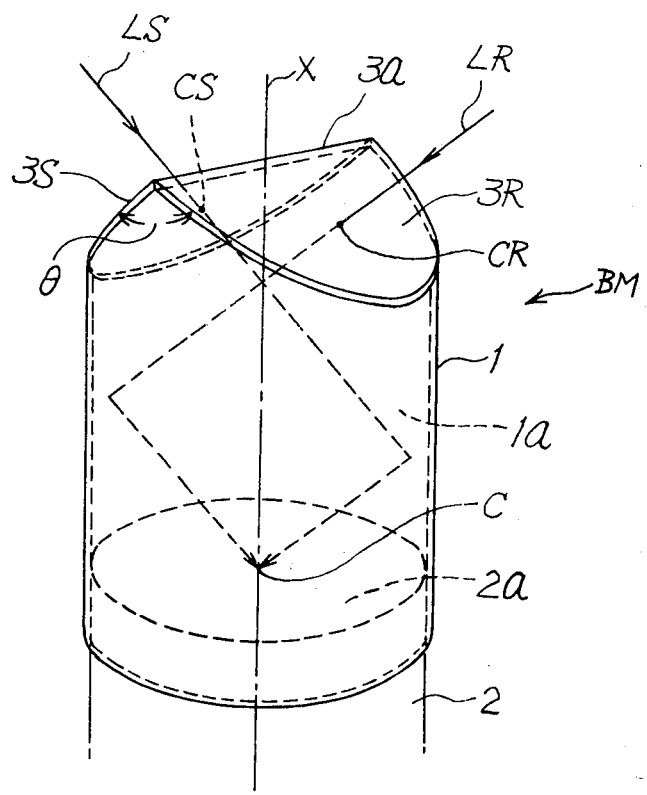
FIG. 2 is a perspective view of the detector shown in FIG. 1.

Referring to FIGS. 1 and 2, there is shown a beam mixer BM comprising a hollow cylindrical body 1 having an inner wall surface formed into a mirror surface 1a. The cylinder 1 is provided at one or the lower end thereof with an end-on type of photomultiplier tube 2. The beam mixer BM further comprises a symmetrical pair of translucent, light diffusing plates 3R and 3S provided on the opposite or upper end of the cylinder 1 and so arranged as to form a generally roof-shaped configuration having a ridge 3a extending diametrically of the cylinder, that is, intersecting the axis X of the cylinder 1 perpendicularly thereto.

The cylinder 1 has an inner diameter such that the photosensitive surface 2a of the photomultiplier tube 2 can be inserted into the lower end of the cylinder 1, with a predetermined suitable distance d between the light diffusing plates 3R and 3S and the photosensitive surface 2a of the photomultiplier tube 2.

As shown in FIG. 2, each of the diffusing plates 3R and 3S has the shape of one half of an ellipse cut along the minor axis thereof, with the cut edges of the two plates 3R and 3S meeting each other at an angle $\theta$ to form the ridge 3a of the roof-shaped configuration. The center CS, CR of each of the light diffusing plates 3R and 3S coincides with the midpoint of half the length of the major axis of the ellipse.

The angle $\theta$ is so determined in relation to the previously mentioned distance d (see FIG. 1) that the light beams LS and LR passing through the centers CS and CR respectively of the light diffusing plates 3S and 3R perpendicularly thereto hit the inner mirror surface 1a of the cylinder 1 at the diametrically opposite sides thereof to be reflected thereby so that the reflected light beams meet at the center C of the sensitive surface 2a of the photomultiplier tube 2. Although the angle $\theta$ is 90° in the illustrated embodiment, it may be set to any other suitable angle, preferably within the range of 80° to 100°.

The light diffusing plates 3R and 3S can be made of any suitable material such as milky glass, quartz, or tracing paper. When a wide range of wavelength from the ultraviolet to the infrared regions is to be covered, a frosted quartz plate is preferred.

Figure 3:
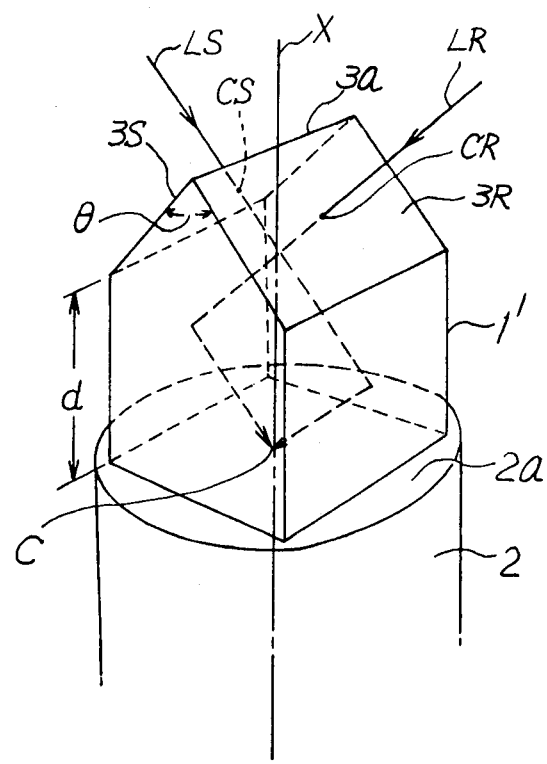
FIG. 3 is a perspective view of another embodiment of the invention.

FIG. 3 shows another embodiment of the invention, wherein the tubular body 1' is square in transverse section instead of being circular as in FIG. 1. Preferably the length of the diagonal line of the sectional square of the body 1' is equal to or a little smaller than the diameter of the photosensitive surface 2a of the photomultiplier tube 2.

Figure 4:
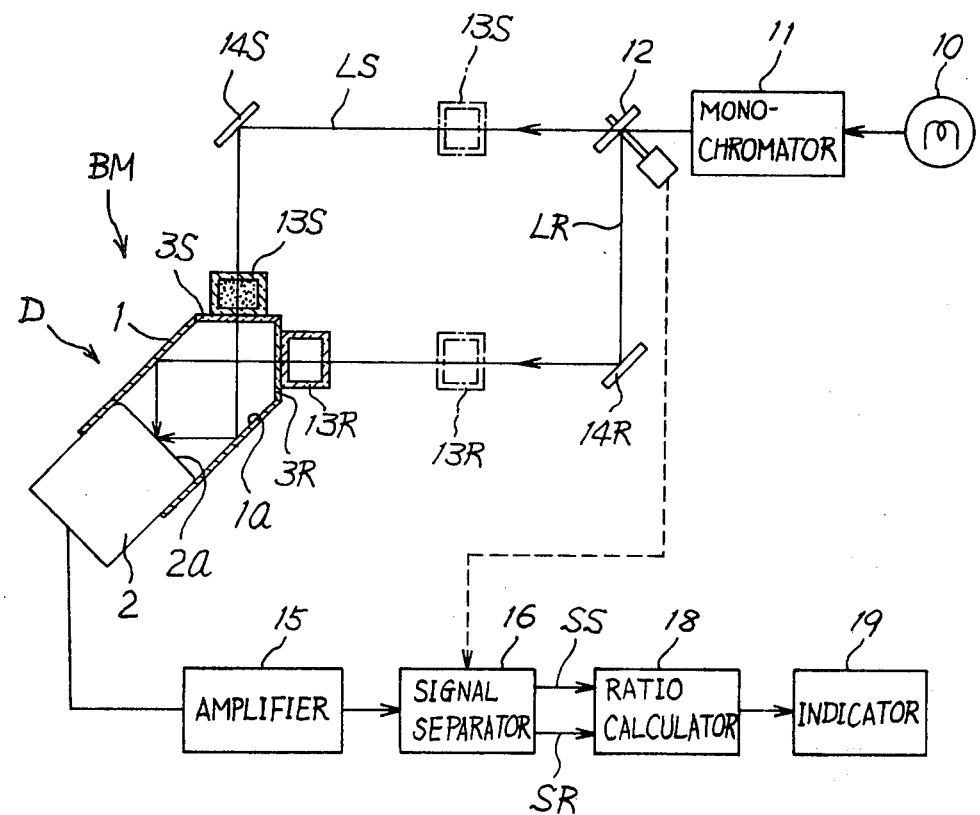
FIG. 4 is a schematic showing of a double-beam spectrophotometer which uses the detector of FIG. 1.

FIG. 4 schematically shows a double-beam spectrophotometer which employs a detector D constructed in accordance with the invention as shown in FIGS. 1 and 2 or FIG. 3. The light from a source 10 is introduced into a monochromator 11, which produces a monochromatic light of a selected wavelength. A rotating sector mirror 12 causes the monochromatic light to alternately advance along two optical paths LR and LS, the beams on which will be referred to as the reference and sample beams and designated by the same symbols LR and LS respectively as the corresponding optical paths.

Mirrors 14R and 14S direct the reference and sample beams LR and LS from the sector mirror 12 to the beam mixer BM of the detector D. A reference cell 13R adapted to contain a reference material or liquid is disposed in the reference beam LR and close to or in substantial contact with the light diffusing plate 3R of the beam mixer, while a sample cell 13S adapted to contain a sample material or liquid to be measured having light scattering property is disposed in the sample beam LS and close to or in substantial contact with the other diffusing plate 3S of the beam mixer.

The alternate reference and sample light beams from the cells are diffused by the plates 3R and 3S respectively and then reflected by the inner mirror surface 1a of the hollow cylindrical body 1 or 1' of the beam mixer so as to alternately reach the photosensitive surface 2a of the photomultiplier tube 2. Due to the diffusion both the reference and sample light beams are substantially evenly and uniformly distributed all over the photosensitive surface of the photomultiplier tube, so that the errors which would otherwise be caused in the results of measurement by local difference in sensitivity of the photosensitive surface of the photomultiplier tube can substantially completely be eliminated, and due to the reflection on the inner mirror surface 1a of the cylinder 1 substantially all the light from the cells can be captured by the photomultiplier tube, so that efficiency of use of the light from the cells is greatly improved.

When a light-scattering sample is to be measured by a double-beam spectrophotometer with a single conventional detector, the cell containing the sample must be positioned immediately before the derector in order that the detector may receive as much of the light from the sample as possible. Such arrangement, however, makes it impossible to measure both the sample and reference lights by the single detector.

In order that the single detector can receive both the reference and sample lights, it must have a wide photosensitive surface with the sample and reference cells being spaced quite a distance away from the detector so that both the sample and reference light beams impinge upon the same photosensitive surface. With this arrangement, however, the sample and reference light beams impinge on different parts or areas of the photosensitive surface of the detector where local difference in sensitivity exists inevitably, so that the two light beams are detected with different degrees of sensitivity to produce errors in the results of measurement. Such errors can be completely avoided by using the detector of the invention as previously mentioned.

The outputs from the detector D caused by the sample and reference beams respectively are amplified by an amplifier 15 and separated by a signal separator 16 operating in synchronism with the rotating sector mirror 12 into a sample and a reference signal SS and SR. A ratio calculator 18 calculates the ratio of the two signals and produces an output corresponding to the concentration of the sample, which is applied to an indicator or recorder 19.

Figure 5:
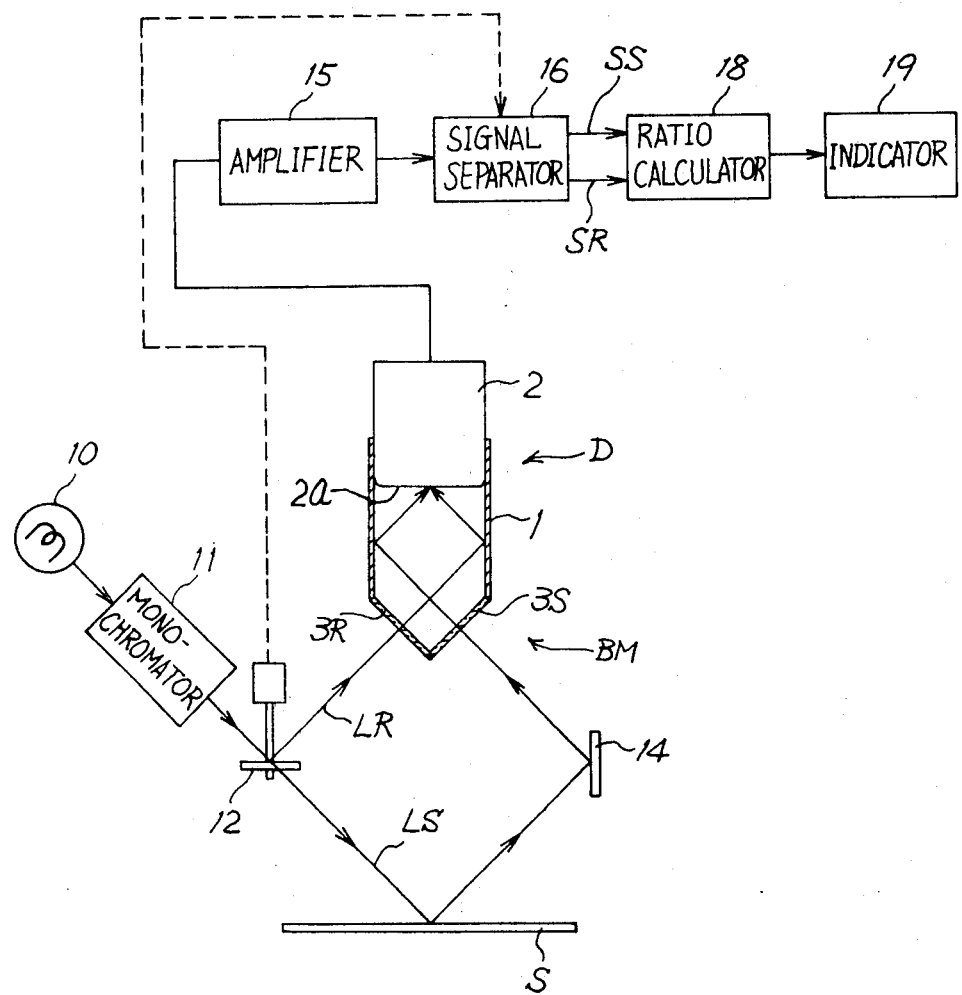
FIG. 5 is a schematic showing of a light reflectivity measuring instrument using the detector of FIG. 1.

FIG. 5 schematically shows a light reflectivity measuring instrument which also employs a detector D as shown in FIG. 1 or 3. In FIG. 5 the same reference symbols and numerals as in FIG. 4 denote corresponding parts. A monochromator 11 produces a monochromatic light of a selected wavelength. A rotating sector mirror 12 causes the monochromatic light to alternately advance along reference and sample paths LR and LS.

The reference beam on the path LR hits the diffusing plate 3R of the beam mixer BM of detector D, while the sample beam on the other path LS passing through the sector mirror 12 is projected onto a sample S in the form of a sheet the reflectivity of which is to be measured. The sample sheet S is supported in place by a suitable member or device not shown. The reflected light from the sample sheet S is again reflected by a mirror 14 so as to hit the other diffusing plate 3S of the beam mixer alternately with the reference beam LR hitting the diffusing plate 3R.

The outputs from the detector D caused by the two beams are amplified by an amplifier 15 and separated by a signal separator 16 operating in synchronism with the rotating sector mirror 12 into a sample and a reference signal SS and SR, the ratio of which is calculated by a ratio calculator 18, which produces an output corresponding to the reflectivity of light of the sample. The output is applied to an indicator or recorder 19.

In accordance with the invention, the adverse effects due to local difference in sensitivity of the photosensitive surface of the single detector has been substantially completely eliminated, and substantially all of the light received by the beam mixer can be captured by the photosensitive surface of the detector, with resulting great improvement in the efficiency of use of light in measurement.

What we claim is:

1. A detector for use in an optical measuring instrument, comprising: a photoelectric element having a photosensitive surface; a pair of light diffusing plates so arranged generally symmetrically that said plates meet along the corresponding edges thereof at a predetermined angle $\theta$ to form a generally roof-shaped configuration having a ridge formed by said meeting edges, said light diffusing plates being spaced a predetermined distance d from and in generally axial alignment with said photosensitive surface of said photoelectric element; and means for enclosing the space between said light diffusing plates and said photosensitive surface.

2. The device of claim 1, wherein said photoelectric element is an end-on type of photomultiplier tube.

3. The device of claim 1, wherein said enclosing means comprises a tubular member having one end opening closed by said diffusing plates and the opposite end opening closed by said photoelectric element, with said photosensitive surface facing inwardly of said tubular member.

4. The device of claim 3, wherein said tubular member is circular in transverse section.

5. The device of claim 3, wherein said tubular member is square in transverse section.

6. The device of claim 3, wherein the inner surface of said tubular member comprises a mirror.

7. The device of claim 1, wherein said angle $\theta$ is within the range of 80° to 100°.

8. The device of claim 6, wherein said angle $\theta$ and said distance d are so determined that the light beams passing through said pair of light diffusing plates perpendicularly thereto are reflected by said inner mirror surface of said tubular member at the opposite sides thereof so that the optical axes of the reflected light beams substantially coincide at the center of said photosensitive surface of said photoelectric element.

9. The device of claim 3, wherein said angle $\theta$ and said distance d are so determined that the optical axes of the light beams passing through said pair of light diffusing plates perpendicularly thereto substantially coincide at the center of said photosensitive surface of said photoelectric element.

10. The device of claim 1, wherein said light diffusing plates are made of a member selected from the group consisting of quartz, milky glass and tracing paper.

11. The device of claim 1, wherein each of said light diffusing plates has the shape of half an ellipse obtained by cutting an ellipse along the minor axis thereof.

12. The device of claim 1, wherein said light diffusing plates are square.

13. A double-beam spectrophotometer comprising: means for producing a monochromatic light beam; means for causing said light beam to alternately advance along a first and a second optical path; a detector comprising a photoelectric element having a photosensitive surface, a pair of light diffusing plates so arranged generally symmetrically that said plates meet along the corresponding edges thereof at a predetermined angle to form a generally roof-shaped configuration having a ridge formed by said meeting edges, said light diffusing plates being spaced a predetermined distance from and in generally axial alignment with said photosensitive surface of said photoelectric element; optical means for directing said beam on said first optical path onto one of said light diffusing plates and said beam on said second optical path onto the other of said light diffusing plates; a first cell disposed in said beam on said first optical path; and a second cell disposed in said beam on said second optical path.

14. The apparatus of claim 13, wherein each of said first and second cells is disposed in substantial contact with one of said pair of light diffusing plates.

15. An instrument for measuring the light reflectivity of a sample, comprising: means for producing a monochromatic light beam; means for causing said light beam to alternately advance along a first and a second path; a detector comprising a photoelectric element having a photosensitive surface, a pair of light diffusing plates so arranged generally symmetrically that said plates meet along the corresponding edges thereof at a predetermined angle to form a generally roof-shaped configuration having a ridge formed by said meeting edges, said light diffusing plates being spaced a predetermined distance from and in generally axial alignment with said photosensitive surface of said photoelectric element; means for placing a sample in one of said first and second paths so that said light beam on said one path is reflected by said sample; optical means for directing said light beam on said one path as reflected by said sample to one of said diffusing plates of said detector and said light beam on the other of said first and second paths to the other of said light diffusing plates; and means for receiving the outputs of said detector caused by said light beams on said first and second paths to produce a signal corresponding to the light reflectivity of said sample.

* * * * *